United States Patent [19]
Durham et al.

[11] Patent Number: 5,761,517
[45] Date of Patent: Jun. 2, 1998

[54] SYSTEM AND METHOD FOR REDUCING POWER CONSUMPTION IN HIGH FREQUENCY CLOCKED CIRCUITS

[75] Inventors: Christopher McCall Durham; Peter Juergen Klim, both of Austin, Tex.

[73] Assignee: International Business Machines Corporation, Armonk, N.Y.

[21] Appl. No.: 702,405

[22] Filed: Aug. 14, 1996

[51] Int. Cl.⁶ .................................................. G06F 1/32
[52] U.S. Cl. ................................. 395/750.04; 395/556
[58] Field of Search ........................ 395/750.04, 559, 395/560, 556, 555

[56] References Cited

U.S. PATENT DOCUMENTS

| | | | |
|---|---|---|---|
| 4,093,871 | 6/1978 | Plumb et al. | 307/106 |
| 4,716,551 | 12/1987 | Inagaki | 365/222 |
| 5,073,838 | 12/1991 | Ames | 361/103 |
| 5,086,387 | 2/1992 | Arroyo et al. | 395/750.04 |
| 5,222,239 | 6/1993 | Rosch | 395/750.04 |
| 5,465,367 | 11/1995 | Reddy et al. | 365/222 |
| 5,511,203 | 4/1996 | Wisor et al. | 395/750.04 |
| 5,628,001 | 5/1997 | Cepuran | 395/556 |
| 5,630,148 | 5/1997 | Norris | 395/750.04 |
| 5,664,201 | 9/1997 | Ikedea | 395/750.04 |

FOREIGN PATENT DOCUMENTS 06175956  6/1994  Japan .

OTHER PUBLICATIONS

IBM Technical Disclosure Bulletin, vol. 38, No. 5, May, 1995, pp. 465–468, "Differential Current Switch Data Interface to an EDA Drive Bipolar Embedded Array".

IBM Technical Disclosure Bulletin, vol. 38, No. 1, Jan., 1995, pp. 27–34, "Algorithm for Incremental Timing Analysis".

IBM Technical Disclosure Bulletin, vol. 33, No. 12, May, 1991, pp. 439–441, "Efficient Power–Supply Decoupling Scheme for Dynamic Rams".

IBM Technical Disclosure Bulletin, vol. 29, No. 10, Mar., 1987, pp. 4527–4528, "Infrared Transmitter with Dual Power Levels".

IBM Technical Disclosure Bulletin, vol. 22, No. 1, Jun., 1979, pp. 140–141, 142–143, "Cache Bit Selection Circuit".

*Primary Examiner*—Glenn A. Auve
*Attorney, Agent, or Firm*—Mark E. McBurney; Casimer K. Salys

[57] ABSTRACT

A system and method are provided which automatically change the output of an oscillator clock prior to its input to dynamic logic circuit elements as a system clock signal. The oscillator clock signal is controlled based upon a signal generated by a sensor which determines the power consumption of the integrated circuit. The frequency of the clocked signal is reduced (or increased) incrementally based upon the output of the sensor which detects the level of a specific circuit characteristic, relating to electrical power consumption. A pattern generator is used to input a digital signal to a series of interconnected registers which make up a loadable shift register. The output of the pattern generator is based upon the input from the sensor. The bits shifted through the shift register are ANDed with the oscillator clock signal to control the frequency of the system clock.

14 Claims, 5 Drawing Sheets

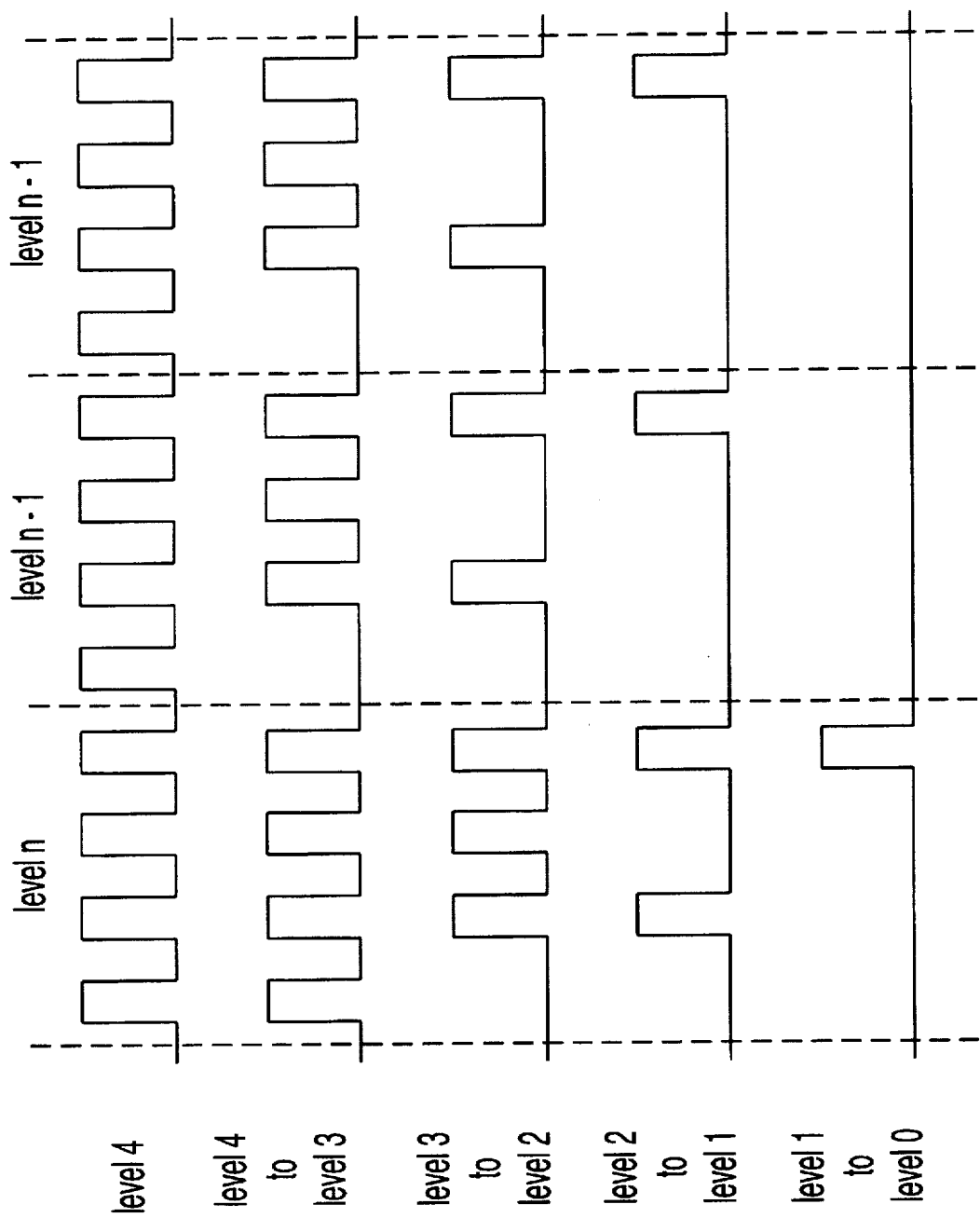

SYSTEM AND METHOD FOR REDUCING POWER CONSUMPTION IN HIGH FREQUENCY CLOCKED CIRCUITS

BACKGROUND OF THE INVENTION

The present invention generally relates to the dynamic regulation of power consumption in clocked circuits. More particularly, the present invention regulates the output frequency of an oscillator circuit prior to its input as a system clock signal for dynamic logic circuits in order to control power consumption in high frequency circuits.

For complementary metal-oxide semiconductor (CMOS) high performance computing systems, high data throughput is essential. Clock systems having very high clock rates, i.e. frequencies, are becoming more common in the computer industry. The majority of power consumption rises proportionally to the frequency and proportionally to the square of the voltage. Additionally, power consumption is also a function of the signal rise time (short circuit current). Keeping in mind that the power consumption is closely related to frequency and to the generation of heat, severe performance limitations, reliability concerns and system failures could arise if the problems of heat dissipation and power consumption are not addressed. Further, these factors must be considered as critical design points when developing integrated circuits which run at very high frequencies.

It is known that one way to save power is to shut down all idle circuitry during specific operations. However, problems exist with this approach when all functions, which could be shut down to save power, are busy processing data. Additionally, it is possible that even with specific functions shut down the power dissipation requirements still exceed the thermal characteristics of the package. That is, the integrated circuit package is unable to dissipate heat at a rate greater than or equal to the rate at which heat is being generated by the integrated circuit. Therefore, a technique is needed which will reduce power without interrupting any critical data processing operations and which will maintain the validity of the data. Other prior art circuits use algorithms which put portions of the integrated circuit into a sleep mode. However, these prior art techniques are complicated and require a great deal of cost and design overhead. Therefore, it can be seen that a solution is needed which will reduce the power requirements of the circuit, without interrupting the clocked data processing operations and destroying valid data.

SUMMARY OF THE INVENTION

In contrast to the prior art, the present invention automatically changes the output of an oscillator clock prior to its input to dynamic logic circuit elements as a system clock signal. The oscillator clock signal is controlled based upon a signal generated by a sensor which determines the power consumption of the integrated circuit. Generally, the frequency of the clocked signal is reduced (or increased) incrementally based upon the output of the sensor which detects the level of a specific circuit characteristic, such as heat generated, electrical current utilized, or the like. A pattern generator is used to input a digital signal to a series of interconnected registers which make up a loadable shift register. The output of the pattern generator is based upon the input from the sensor, such that the system clock is then controlled based upon the measured characteristic. The present invention allows the system clock to be output at the same frequency as the oscillator clock when the sensor detects a power consumption condition on the IC which is in the acceptable range. However, if a power high condition occurs, the pattern generator alters its bit pattern output to the registers in order to incrementally reduce the frequency of the system clock signal, being input to the clocked elements of the circuit. For example, a system clock may be initially running at the same frequency as the oscillator when the first power high condition is recorded. At this time, the pattern generator alters its output such that the frequency of the system clock is reduced by, for example 25%, which correspondingly reduces the power consumption of the circuit. Subsequently, a state machine samples the power high signal output from the sensor and if it is still enabled (active), the pattern generator then issues a different sequence of bits which causes the shift register to incrementally reduce the system clock by a predetermined percentage, such as 25% to reach a clock frequency of 50% of oscillator frequency. The state machine then continually monitors the power high signal until it is inactive, or disabled. The pattern generator then issues a sequence of bits which cause the system clock frequency to increase.by a predetermined amount. Thus, the power_high signal provides feedback control which allows the present invention to seek the optimum system clock speed, based on the power consumption of the circuit. In this manner, the present invention provides feedback which allows the frequency of the clocked system to be dynamically adjusted based upon the level of the characteristic being monitored by the sensor.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 4 is a timing diagram showing the frequency which corresponds to the levels of FIG. 2 and the incrementally adjusted frequency at each level based upon the power consumption of the circuit.

DETAILED DESCRIPTION OF THE PREFERRED EMBODIMENTS

Figure 1A:
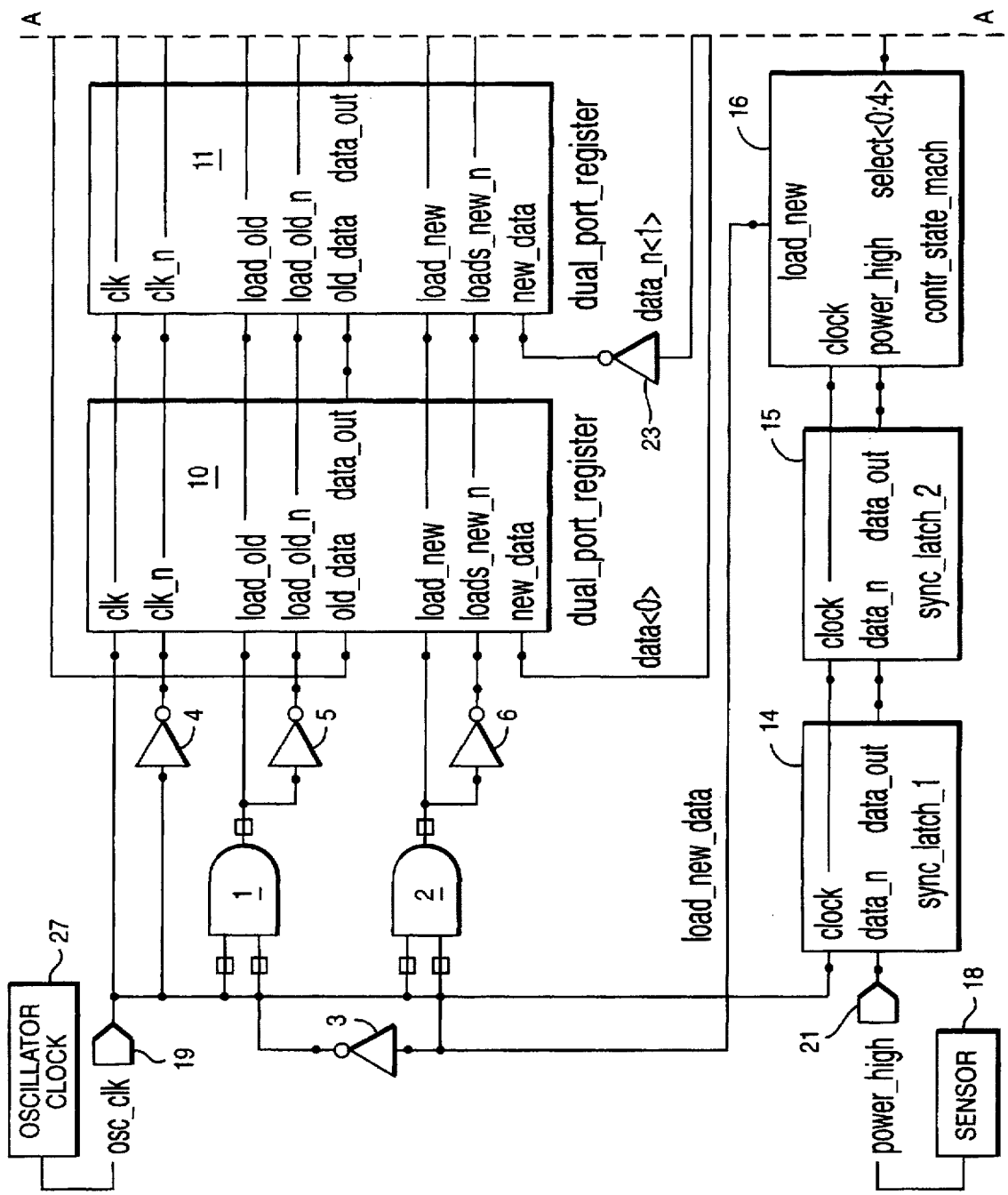
FIGS. 1A and 1B together present a schematic diagram showing the elements which regulate the system clock frequency based upon input from a sensor which monitors the power consumption of the circuit.

The present invention utilizes a sensor which measures a circuit parameter, such as temperature or electrical current usage to generate a control signal referred to herein as $power_{13}$ high, which indicates to the system when an excessive power consumption condition exists. More specifically, the integrated circuit, or chip, receives a clock signal from an oscillator 27 (osc_clock), but instead of transmitting the oscillator clock signal directly to the functional circuits, the oscillator clock signal is connected as a clock (clk) and inverted clock (clk_n) signals and input to four dual port registers which are interconnected to form a loadable 4 bit shift register. The oscillator clock and its complement are also connected to various AND-gates, as well as synchronization latches and a control state machine (contr_state_mach), as discussed below in conjunction with FIG. 1. The purpose of the synchronization latches is to double latch and therefore synchronize the power_high signal which is provided to the clock in order to avoid metastability conditions. When the power_high signal is active, it indicates that an excessive power condition is present on the chip or macro, i.e. excessive power consumption is occurring.

When power on reset occurs, a pattern generator (pattern_gen) will output a sequence of logical 1's (1111) to the loadable 4 bit shift register. The complement of some of these bits may actually be input to the new_data ports of the various dual port registers since one preferred embodiment uses inverting registers. The control state machine provides a load_new_data signal which clocks the bits from the pattern generator into each register of the 4 bit shift register. The next clock latches the data through the new_data port into the shift register. On the following clock, load_new_data goes low and load_old_data goes high (active) such that data from the output of each dual port register is fed to the next sequential dual port register, where it is latched in and subsequently shifted through the shift register as old_data via the old_data inputs. This is because the load_old_data lines are active whenever the load_new_data lines are unasserted. Consequently, when the pattern generator outputs bit pattern 1111 the system clock output to the logical circuits is now a replica of the osc_clock, wherein the system runs at full (100%) clock speed. This is based upon the output of the four (4) logical ones from the pattern generator. It will be seen that varying the bit pattern from the pattern generator will cause the system clock to run at a predetermined percentage of the oscillator clock speed. As previously noted, the system was brought up at power_on reset to run the system clock speed at 100 percent of the oscillator clock. The state machine will now continually monitor the power_high signal line.

If the power_high signal goes active, a power fault, i.e. excessive power condition, is indicated. At this time the control state machine will evaluate its current state. If this power_high condition is the first power fault to occur since the system has been powered on, the state machine will still be in state level 4. More particularly, when the machine is initially powered on it will run at full oscillator clock speed which corresponds to state level 4 and is the initial state condition. When the control state machine first determines the power_high signal is active, the state machine will shift to a level 3 and transmit appropriate control select signals to the pattern generator which will in turn output a 0111 bit pattern.

As will be discussed in more detail below, a logical 0 output at 1 bit position from the pattern generator will cause a 25% decrease in system clock effective frequency. It should be noted that the present invention will be described using a 4 bit pattern from the pattern generator which will provide incremental dynamic adjustment of 25% of the oscillator clock frequency. However, those skilled in the art will understand that additional bits could be utilized to provide a more detailed level of incremental control as required by a particular circuit designed. For example, 5 bits from the pattern generator will provide an incremental adjustment of 20% of oscillator clock speed and 10 bits would provide a 10% adjustment of the oscillator clock speed.

The 0111 bits from the pattern generator are presented to each register as a 0010 bit pattern due to the presence of inverters 23, 25 which account for the inverting buffers used in the four bit shift register of a preferred embodiment of the present invention. Of course, the present invention contemplates using non-inverting buffers in the 4 bit shift register such that the bits output from the pattern generator directly correspond to those input to the shift register. Following the clock signal this data is loaded into the corresponding shift register with the load_new_data being active. As subsequent clock signals shift this data through the register, the 0 input to register 10 appears at an AND-gate 7 for the first time after three clock pulses. The AND-gate is also connected to the oscillator clock and therefore, every fourth system clock pulse will be negated from then on, thereby reducing the effective clock frequency to 75% of the oscillator clock. In this manner the data is essentially compared with the oscillator clock by AND gate 7 such that data from each register (stage) in the shift register will regulate the clock by a percentage based on the number of stages in the shift register.

The state machine continually samples the power_high signal line after a predetermined number of clock cycles, the predetermined number being based upon system requirements. If the power_high signal remains active for this predetermined period of time, the state machine will then change to a level 2 and send appropriate select control signals to the pattern generator which then outputs a 0101 bit pattern which then becomes 0000 when provided to the inputs of the shift register (due to inverters 23, 25). As noted above, these bits are then clocked through the stages of the shift register and each time a logical 0 is ANDed together with the oscillator clock, the system clock pulse will be negated, such that the system clock is reduced to 50% of the oscillator clock frequency. That is, the logical 0 inputs to registers 10 and 12 will be output as a logical 0 to AND gate 7. The logical 0 inputs to registers 11 and 13 will be output as a logical 1 to AND gate 7. Thus, the bit pattern 0101 is ANDed with the oscillator clock signal and its frequency will be reduced by 50% before being output as the system clock. For example, if the oscillator was at 100 megahertz and 0101 is output by pattern generator 17, then the system clock will be running at 50 MHz.

Further, if the power_high signal remains active through another predetermined sampling period, the control state machine sends appropriate select signals to the pattern generator and a 0001 bit pattern is output such that 0100 is loaded into the shift register, thereby reducing the system clock frequency to 25% of the oscillator clock frequency, since the inverting registers cause a 0001 to be ANDed with the oscillator clock signal. If necessary, a level 0 state could be reached which would completely turn off the system clock. That is, a 0000 bit pattern would be output and a 0101 presented to the shift register by the pattern generator wherein a 0000 will be ANDed with the oscillator clock. Various state levels 0 through 4 present the opportunity by the present invention to generate a control signal to a power supply which in response may lower the power supply voltage.

When the power_high signal becomes inactive, as determined by the control state machine, select signals will be issued to the pattern generator and shift up the state of the circuit to the next highest level after a predetermined sampling period of clock cycles. That is, if the system clock is at 50% of the oscillator clock and a 0101 bit pattern is output by the pattern generator causing a 0000 to be input to the shift register (due to inverters 23, 25), and, the power_high signal goes inactive, then the control state machine will cause the pattern generator to issue a 0111 bit pattern and a corresponding 0010 pattern will be input to the shift register thereby increasing the effective system clock frequency to 75% of the oscillator clock frequency. Individual circuits do not decrease their speed based upon the output of the pattern generator, therefore their rise and fall times are maintained and short circuit current will not increase. It should be noted that the present invention may be utilized at a chip level, as well as a macro level although some synchronization techniques may be required.

Referring to the composite of FIGS. 1A and 1B, a preferred embodiment of the present invention will now be described wherein reference numeral 19 is an input to the circuit of the present invention from oscillator clock 27. Dual port registers 10, 11, 12 and 13 are also shown each receiving the oscillator clock input from node 19. As previously discussed, registers 10, 11, 12 and 13 are connected to form a loadable 4 bit shift register. Each of these dual port registers receive the oscillator clock signal from node 19 and the complement of this clock signal (clk_n) from the output of an inverter 4 which receives the input from the oscillator clock. Each of these registers will also receive a control signal in the form of a bit from the bit pattern output by pattern generator 17. Sensor 18 is also shown which inputs a power_high signal to node 21 and subsequently to synchronization latches 14 and 15. Latches 14 and 15 also receive the clock signal from oscillator clock node 19. Control state machine 16 is shown which continually samples the power_high signal which is double latched by latches 14 and 15, and input to the state machine from latch 15. Further, control state machine 16 outputs a select signal to pattern generator 17 which is dependent upon the state of the power_high signal. Additionally, control state machine 16 outputs a load_new_data signal to inverter 3 and an AND gate 2. The load_new_data signal from control state machine 16 is ANDed together with the signal from the oscillator clock and output to the shift register as the load_new_data signal. The complement of this load_new_data signal is also input to the shift register from an inverter 6. The complement of the load_new_data signal from control state machine 16 is provided to AND gate 1 along with the oscillator clock signal from node 19. The output of AND gate 1 is then provided to the shift register as the load_old input. Additionally, the complement of this signal is provided to each of the registers in the 4 bit shift register from an inverter 5 as the load_old_n_signal.

In response to the select signal from control state machine 16, pattern generator 17 outputs a frequency control bit pattern to each of the registers 10, 11, 12 and 13 in the 4 bit shift register. That is, each dual port register includes a new_data port which receives one of the bits output from pattern generator 17. It should be noted that a preferred embodiment illustrates a 4 bit pattern from pattern generator 17. However, bit patterns of varying lengths can be utilized as needed to achieve the level of detail required by the specific system design, i.e. 8 bits would provide additional levels of control, whereas 2 bits would provide less control. Of course, the present invention contemplates these variable length bit patterns.

Each dual port register 10, 11, 12 and 13 in the 4 bit shift register as shown in FIG. 1 includes a data_out port which is circularly connected to the old_data input port of the next sequential dual port registers. More specifically, the data_out of register 10 is input as the old_data of register 11. Similarly, the data_out of register 11 is input as the old_data of register 12, and so on. The data_out port of register 13 is connected to the old_data port of register 10 and is also provided to AND gate 7 in conjunction with the oscillator clock signal initially input at node 19. The output of AND gate 7 is placed on node 20 and is used by the integrated circuit device as the system clock.

It can be seen that the oscillator clock signal is used to continually shift data through each of dual port registers 10, 11, 12 and 13. The oscillator clock is also provided as an input to AND gate 7. As previously described, in the case of bit pattern 1111 output from pattern generator 17 inverters 23, 25 cause the bit pattern 0101 to actually input to the registers 10, 11, 12, 13, respectively. Since these are inverting registers (or buffers) this pattern (0101) will cause a logical 1 to continually be present at AND gate 7 as the bits are shifted through the shift register. That is the logical 0 to register 13 will be inverted to a logical 1, the logical 1 input to register 12 will be inverted to a logical 0 and then input to register 13 where it will be inverted and output as a logical 1. The logical 0 to register 11 will be output as a logical 1 to register 12 and then as a logical 0 to register 13 which then outputs a logical 1 to gate 7. The logical 1 input to register 10 will be inverted and provided to register 11 as a logical 0. This logical 0 will be inverted to a logical 1 by register 11 and provided to register 12, which then inverts it and supplies a logical 0 register 13. And, register 13 inverts this logical 0 and provides a logical 1 to AND gate 7. Thus, the bit pattern 1111 from generator 17 will cause a logical 1 to be output from data_out port of register 13 at each oscillator clock cycle. In this case, AND gate 7 will output a system clock signal which is identical to the oscillator clock frequency, because the oscillator clock signal and data output of the shift register will always be active and output the oscillator clock at the same frequency as the system clock, which is considered state level 4. In the case where sensor 18 has determined that a high power condition exists, the power$_{13}$ high signal is provided to synchronization latches 14 and 15. Then, control state machine 16 receives a control signal from latches 14 and 15 indicating the existence of the high power condition. Select signals are then issued by state machine 16 to pattern generator 17 so that a bit pattern corresponding to state level 3 can be provided by pattern generator 17. At this time, a 0111 bit pattern output from pattern generator 17 and a 0010 is issued to the 4 bit shift register. That is, a zero is input as the new_data in registers 10, 11 and 13. A logical one is input to register 12. The logical zero input to register 10 will cause a logical 1 to be output on the data_out port of register 10 and input to the old_data port of register 11. A logical 0 is then output to register 12 and a logical one is input to register 13 such that the logical zero is output from register 13 to AND gate 7. It can be seen that the logical zero will occur 25% of the time, since 1 of the 4 bit characters causes a logical zero to be present at AND gate 7. Thus, for every fourth cycle, the active portion of the oscillator clock is negated and the system clock output on node 20 will run at an effective clock frequency of 75% of the oscillator clock. This is at state level 3.

Control state machine 16 will then continually monitor latch 15 and if the power_high signal is still present after a predetermined amount of time, select signals will be provided to pattern generator 17 which will cause the present invention to move to state level 2. A 0101 bit pattern is provided by generator 17 to registers 10, 11, 12 and 13, respectively. That is, a logical zero is provided to registers 10, 11, 12 and 13. Therefore, as these bits are shifted between inverting registers 10, 11, 12 and 13 a logical zero will appear at the input to AND gate 7 50% of the time since logical 0s input to registers 10 and 12 will cause a logical 0 to be present at gate 7, whereas 0s input to registers 11 and 13 will cause a logical 1 to be present at gate 7. Thus, the output of gate 7 will be a system clock signal at a frequency of 50% of the oscillator clock 19. Again, control state machine 16 will monitor latch 15 for the power_high signal and if the signal is still present after another predetermined period of time, select signals will be sent to pattern generator 17 to cause the system to move to state level 2. As state level 2, a 0001 bit pattern is output by pattern generator 17 which causes a 0100 bit pattern to be input to registers 10, 11, 12 and 13, respectively. In this case, a logical zero will be present at the input of AND gate 7 three out of four times, such that the system clock will run at a frequency 75% less than the oscillator clock 19, i.e. system clock frequency will be 25% of the oscillator clock frequency. If, after another predetermined period of time, control state machine still detects the power_high signal in latches 14 and 15, the system will reach a level 0 state such that the system clock 20 is completely turned off. That is a bit pattern of 0000 output by pattern generator 17 and a 0101 is input to registers 10, 11, 12 and 13, respectively. Therefore, a logical zero will always be present at AND gate 7 such that a logical zero when ANDed with the output of the oscillator clock 19 will provide a zero frequency system clock signal on node 20, because the is input to registers 11 and 13 cause a 0 to be output to gate 7 (due to the use of inverting registers). And, a logical 1 at the outputs of registers 10 and 12 will also cause a 0 to be output to gate 7 when shifted through the individual registers. In this state, the machine is completely turned off.

Figure 1B:
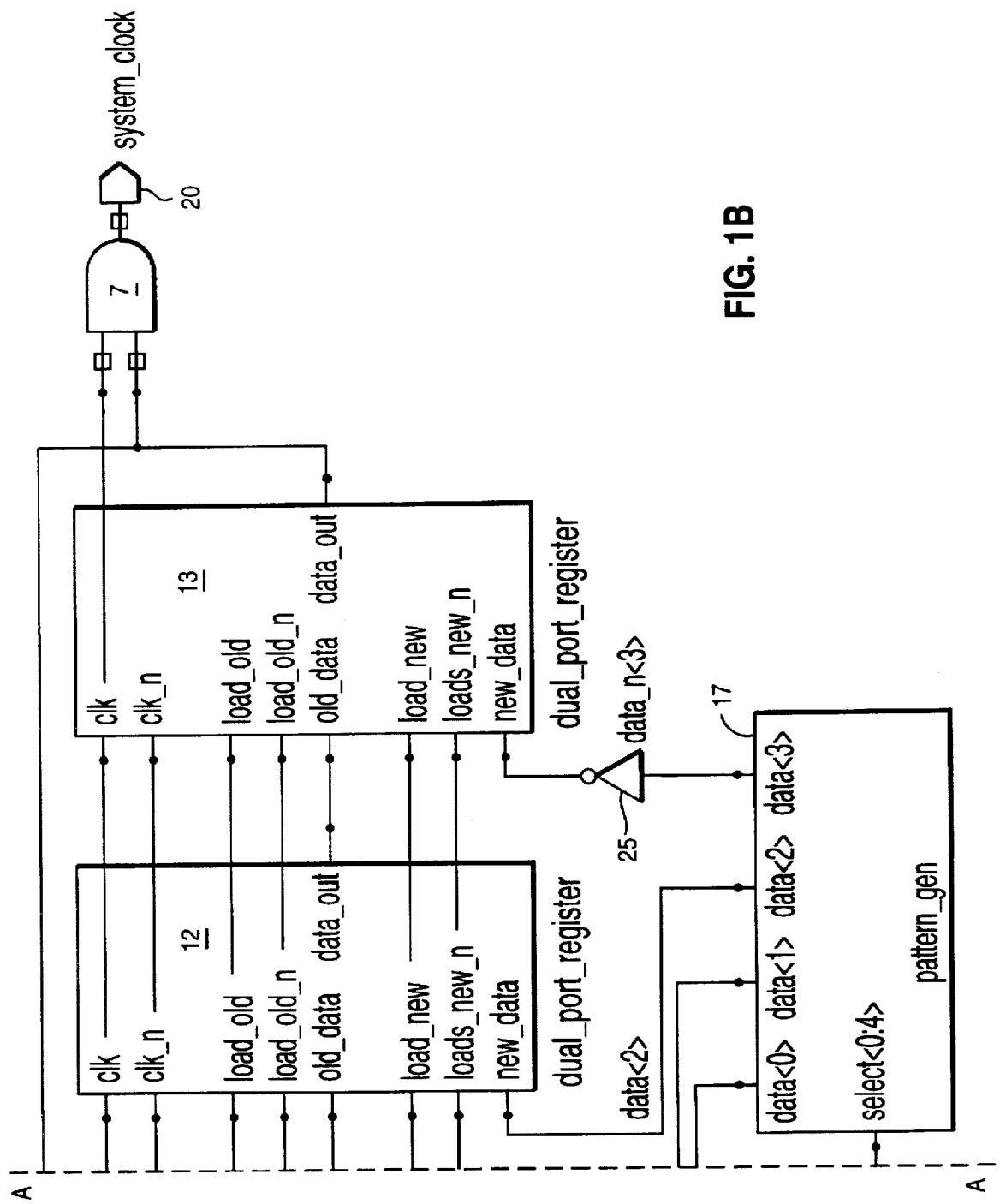

It can be seen that the system as illustrated in FIGS.1A and 1B is brought up at full speed, i.e. level 4, but is stepped down to level 0 based upon the continued presence of the power_high signal from sensor 18. Again, additional dual port registers can be utilized to increase the number of levels and granularity of system clock frequency. Further, the present invention can iteratively step the system up from level 0 to level 4 when the power_high signal is inactive.

When at level 0, if control state machine 16 determines that the power_high signal is inactive, the select signal output to pattern generator 17 will cause a transition to level 1 wherein the 0000 bit pattern output by generator 17 is replaced by the 0001 bit pattern and the system clock frequency then becomes 25% of the oscillator clock. Similarly, if the power_high signal remains inactive for another predetermined period of time, the select signals from state machine 16 will cause pattern generator 17 to issue a 0101 bit pattern and increase the system clock frequency to 50% (state level 2). Also, the control state machine will cause the select signals issued to pattern generator 17 to move the system to level 3 when the power_high signal is not present for another predetermined period of time. At state level 3, the system clock frequency is increased to 75% of the oscillator clock frequency, since a 0111 bit pattern is issued by generator 17. Finally, the system will move from level 3 to level 4 when the power_high signal remains inactive for a predetermined period of time as determined by control state machine 16, which causes the pattern generator 17 to issue bit pattern 1111 causing the system clock to run at the same frequency as the oscillator clock.

It can be seen that the present invention allows the system to step through a portion of the various levels. For example, the control state machine 16 may determine that a power_high condition occurs and causes the system clock to be at state level 3, or 75% of the oscillator clock. At the next sampling, the power_high signal may still be present causing the system to go to level 2 (wherein the system clock is at 50% of the oscillator clock). Then, at the next sampling period the power_high signal may be inactive and the control state machine 16 will cause the pattern generator to move the system from state level 2 back to state level 3, i.e. from a system clock running at 50% of the oscillator clock to a system clock effective frequency at 75% of the oscillator clock. Thus, it can be seen how the present invention as shown in FIG. 1 provides a great deal of flexibility and efficiency when determining the optimum system clock frequency based upon the electrical power usage of the integrated circuit.

Figure 2:
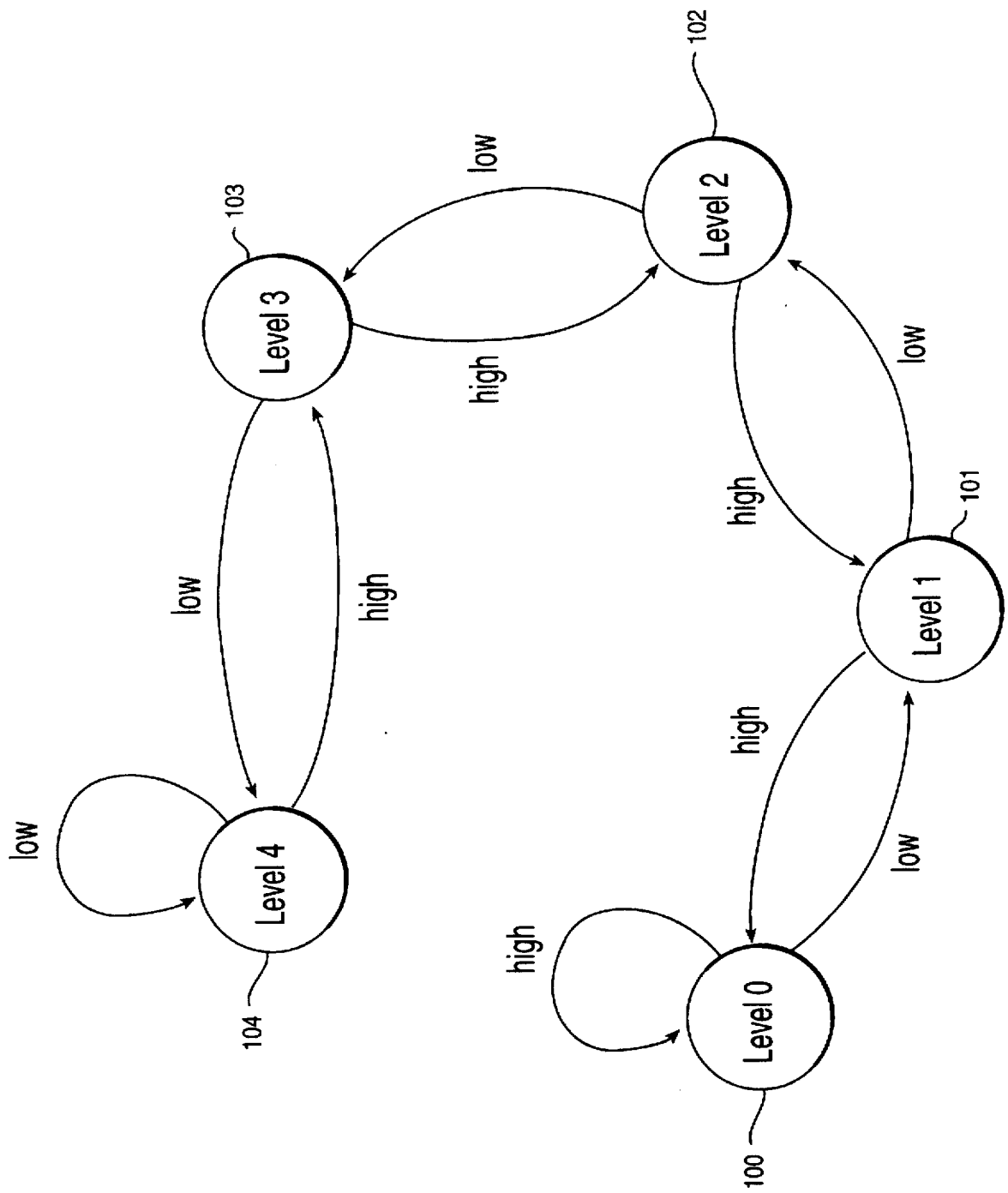
FIG. 2 is a state diagram representing the various frequency levels of the system clock between which the present invention dynamically adjusts and seeks the optimum level based upon the specific functions performing data processing activities.

Referring to FIG. 2, a state diagram is shown wherein level 4 is represented by reference numeral 104 and is the state of the system at initial power on (system clock speed equal to the oscillator clock). So long as the power_high signal is inactive, or low, the system will remain at the level 4 frequency. However, when the state machine 16 determines that the power_high signal is high the system steps to level 3 as shown by reference numeral 103. So long as the power_high signal remains active, the system steps down through the various levels to level 2 (102), level 1 (101) and level 0 (100). At level 0 so long as the power_high signal remains high (active), the system remains turned off at level 0, as previously discussed. However, once the power_high signal becomes inactive then the system steps back up through the various state levels, i.e. level 1 (101), level 2 (102), level 3 (103) to level 4 (104). For some applications, the present invention will seek out a specific level and remain at that level using the state of the power_high signal as feedback input to achieve dynamic adjustment of the system clock frequency.

Figure 3:
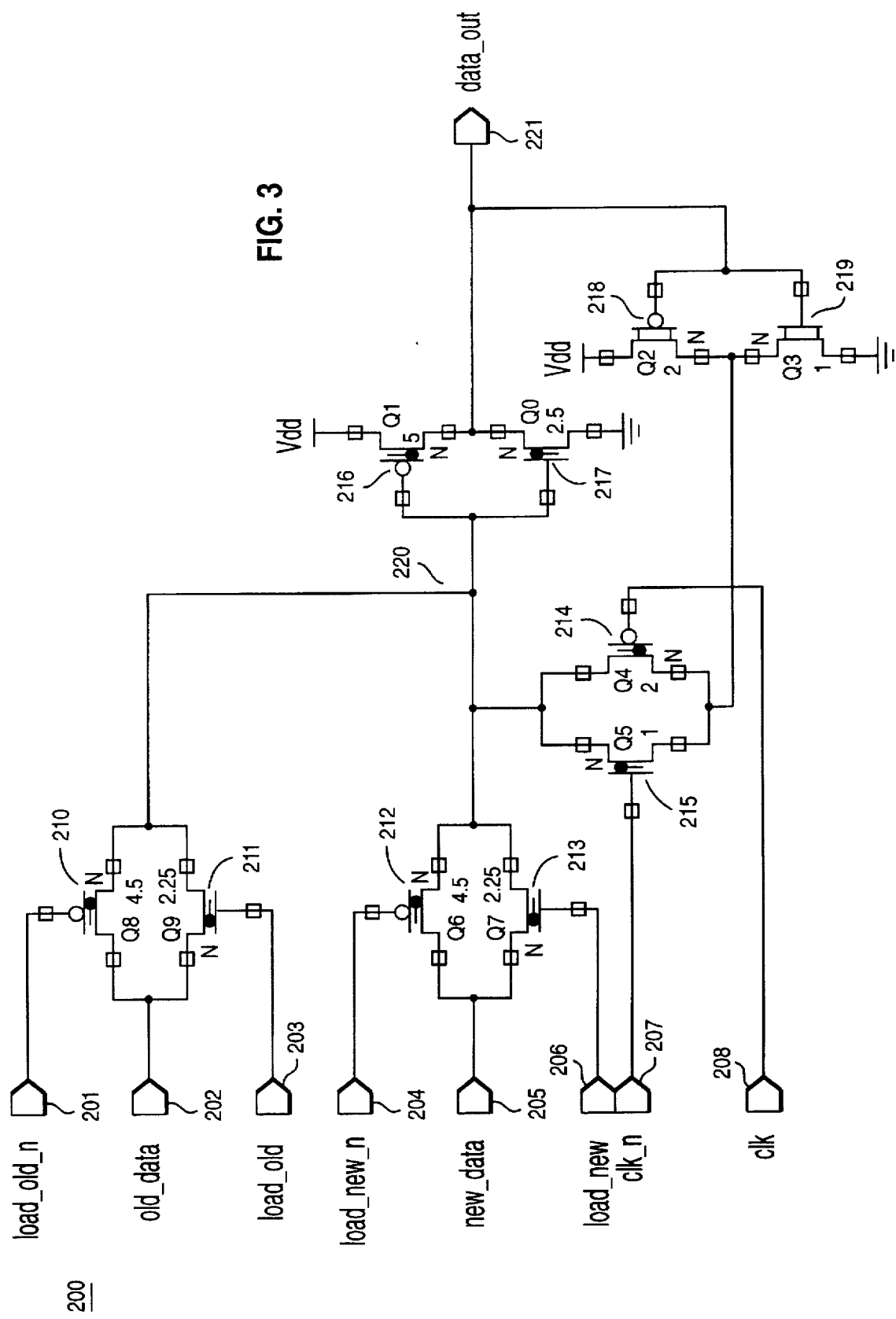
FIG. 3 is a schematic diagram showing the transistors which form up the logic elements utilized in a preferred embodiment of each of the registers shown in FIG. 1.

Referring to FIG. 3, the circuit implementation of a dual port register 10, 11, 12 or 13 is shown as reference numeral 200, and will now be described. The inputs to circuit 200 are designated by reference numerals 201, 202, 203, 204, 205, 206, 207 and 208 and correspond to the inputs shown for each register in FIGS. 1A and 1B. More particularly, the oscillator clock signal is input at node 208 and the complement of the oscillator clock signal is input at node 207. It should be understood that the clock inputs at nodes 207 and 208 are brought to each of the dual port registers 10, 11, 12 and 13 in parallel. Similarly, the control signals load_new and its complement load_new_n, as well as load_old and load_old_n are also provided in parallel to each of the dual port registers. Clock signals 207 and 208 are input to a pass gate circuit which includes transistors 214 and 215. Transistor 214 is a P-type device and the absence of a voltage at its gate (logical 0) causes the transistor to conduct electrical current. Transistor 215 is a N-type device which conducts electrical current only when a voltage is applied to its gate, i.e. a logical 1.

The load_new control signal at node 206 and its complement at node 204 are also input to a pass gate circuit wherein node 206 is connected to N-type transistor 213 and node 204 is connected to P-type transistor 212. The load_old control signal at node 203 and its complement at node 201 are also connected to a pass gate circuit. Node 203 is connected to N-type transistor 211 and node 201 is connected to P-type transistor 210. It will be seen how the new_data at node 205 is shifted into the latch 200 based on the load_new control signal and its complement input at nodes 204 and 206. Similarly, the old_data signal at node 202 will be shifted to the latch based on the load_old control signal and its complement load_old_n. The new_data and old_data control signals are shifted to node 220 at the appropriate times based upon the control signals from control state machine 16 and pattern generator 17. Node 220 is connected to an inverter circuit which includes P-type transistor 216, connected to VDD (supply voltage) and N-type transistor 217 which is connected to ground. The output of this inverter is connected to a data_out node 221 and the signal thereon is then provided to the next sequential dual port register in the 4 bit shift register (and to AND gate 7 in the case of register 13 of FIG. 1). Node 221 is also connected to another inverter circuit which includes P-type transistor 218 connected to VDD and N-type transistor 219 connected to ground. The output of this inverter is then provided to the pass gate circuit including transistors 214 and 215 the output of which is connected to node 220.

The pass gate circuit including transistors 214 and 215 will conduct electricity when the oscillator clock signal is low. That is, when the clock signal is at a logical zero and its complement is at a logical 1. This will cause both transistors 214 and 215 to conduct electricity and connect the output of the inverter circuit including transistors 218 and 219 to node 220. This causes the digital signal output from the inverter with transistors 216 and 217 to be maintained, or latched as the data_out signal on node 221. For example, if the signal on node 221 is a logical zero transistor 218 will be turned on and VDD will be placed at the input to the clock pass gate circuit (transistors 214, 215). When the oscillator clock goes low, VDD will be provided to node 220 and input to the inverter circuit causing N-type transistor 217 to conduct electricity and keep node 221 at a logical zero. In this manner, a logical zero is maintained on node 221. This logical zero will then be provided to node 220 when the oscillator clock goes low and transistor 216 will conduct electricity thereby pulling node 221 up to VDD. Similarly, a logical 1 would be maintained since transistor 219 will cause ground potential to be input to the clock pass gate circuit.

The operation of the circuit of FIG. 3 will now be described in conjunction with FIGS. 1A and 1B. At power on, pattern generator 17 outputs a bit pattern of 1111. Thus, a logical 1 is input to the new_data port of registers 10 and 12, however, a logical zero is input to the new_data port of registers 11 and 13, due to the inverters 23 and 25, respectively. Inverters 23 and 25 are required since registers 10, 11, 12 and 13 include inverter circuits which cause the data_out signal to be the complement of the signals input to the old_data and new_data ports. Taking register 10 as an example, a logical 1 will be placed at node 205 during initialization, and the load_new signal from control state machine will be active on node 206 and its complement 204. Thus, the new_data signal on node 205 (logical 1) is provided to node 220 and output as a logical zero at node 221. This logical zero will then be inverted by register 11 to a logical 1. Register 12 will then invert the logical 1 back to a logical zero, and, register 13 will then provide a logical 1 to AND gate 7.

Similarly, the logical zero provided to register 11 will be provided to register 12 as a logical 1 and input to register 13 as a logical zero and output to AND gate 7 as a logical 1. The logical 1 input to register 12 will be output to register 13 as a logical zero and provided by register 13 to AND gate 7 as a logical 1. Finally, the logical zero input to register 13 will be provided to AND gate 7 as a logical 1. Therefore, it can be seen that the output from the 4 bit shift register to AND gate 7 will always be a logical 1 such that the system clock will run at the same speed as the oscillator clock. It should be noted that the data output at node 221 is input to the next subsequent register at the old_data node 202 and shifted through each subsequent register based upon the load_old its complement, load_old_n, control signals which are gated on the complement of the load_new signal from control state machine 16. Thus, the bit pattern corresponding to the current state is input to nodes 205 of each register 10, 11, 12 and 13 are inverted and continuously shifted between each of the registers until control state machine 16 samples latch 15 and determines that the state of the power_high signal has changed.

As an additional example, assume that the control state machine 16 has determined that the power_high signal is active and the state level of the machine should be changed from level 4 to level 3. In this case, the select signals will cause pattern generator to output a 0111 bit pattern. Thus, a zero is input to the new_data port 205 of register 10, a zero is input to the new_data port of register 11 (due to inverter 23). Further, a logical 1 is input to the new_data port of register 12 and a logical 0 is input to the new_data port of register 13 (due to inverter 25). Each of the control bits input to registers 11, 12 and 13 are identical to the situation as previously described. However, the 0 input to the new_data port of register 10 will be inverted to a logical 1 at the data_out node 221 and input as a logical 1 to register 11 which will then output a logical 0 to register 12. Register 13 will then receive a logical 1 from register 12 and output a logical 0 to AND gate 7. Thus, when the logical 0 bit input to register 10 is shifted to AND gate 7, the oscillator clock signal will be negated, or cancelled 25% of the time (1 in 4). It can be seen that varying the bit pattern output from pattern generator 17 will cause the frequency of the system clock to be dynamically adjusted in accordance with the state of the power_high signal.

Referring to FIG. 4, a timing diagram is shown illustrating the various levels contemplated by the preferred embodiment of the present invention. However, it can be seen that the present invention contemplates n levels and should not be limited to the four levels illustrated in the preferred embodiment. At level 4, the system clock is running at 100% of the oscillator clock as shown. However, when it is determined that a power_high condition exists and the system adjusts to level 3, it can be seen that at level n-1 (level 3) the system clock runs at 75% of the oscillator clock, that is 3 active pulses for every period. Adjusting from level 3 to level 2, it can be seen that only two positive waveforms are present per period and the system clock will run at 50% of the oscillator clock. When shifting from level 2 to level 1 the system clock runs at 25% (1 in 4 positive waveforms per period) of the oscillator clock. Finally, shifting from level 1 to level 0 will completely turn off the system clock as can be seen since there are no positive waveforms in the period. Of course, the timing diagram of FIG. 4 also illustrates the case where the power_high signal becomes inactive and the system shifts upwardly from a low frequency to a high frequency. For example, from level 2 to level 3 wherein two waveforms per period (50%) are increased to three waveforms per period (75%).

Although certain preferred embodiments have been shown and described, it should be understood that many changes and modifications may be made therein without departing from the scope of the appended claims.

We claim:

1. A circuit, comprising:
    means for providing an oscillator clock signal at a first frequency;
    means for determining a power consumption state of said circuit; and
    means for generating a system clock signal by incrementally deleting pulses in synchronism with the oscillator clock signal based upon said power consumption state.

2. A circuit according to claim 1 wherein said means for determining a power consumption state comprises means for outputting a power control signal based upon said power consumption state of said circuit.

3. A circuit according to claim 2 further comprising means for providing a clock control signal to said means for generating in accordance with said power control signal.

4. A circuit according to claim 3 wherein said means for generating further comprises a plurality of sequentially connected stages which output control data to a next said sequential stage in response to said clock control signal.

5. A circuit according to claim 4 wherein said means for generating further comprises means for comparing said control data with said oscillator clock signal to set the frequency of said system clock signal.

6. A circuit according to claim 5 wherein said means for generating further comprises:

means for determining, over a predetermined period of time, whether said power control signal has changed state; and means for altering said clock control signal to cause the frequency of said system clock signal to be reduced when said power control signal remains active.

7. A circuit according to claim 5 wherein said means for generating further comprises:

means for determining, over a predetermined period of time, whether said power control signal has changed state; and means for altering said clock control signal to cause the frequency of said system clock signal to be reduced when said power control signal remains inactive.

8. A method for regulating the frequency of a system clock signal in accordance with power consumption of an electrical circuit, comprising the steps of:

providing an oscillator clock signal at a first frequency;

determining a power consumption state of said circuit; and generating a system clock signal by incrementally deleting pulses in synchronism with the oscillator clock signal based upon said power consumption state.

9. A method according to claim 8 wherein said step of determining a power consumption state comprises the step of outputting a power control signal based upon said power consumption state of said circuit.

10. A method according to claim 9 further comprising the step of providing a clock control signal in accordance with said power control signal.

11. A method according to claim 10 wherein said step of generating further comprises the step of outputting, in response to said clock control signal, control data from a first register in a plural bit shift register to a next register.

12. A method according to claim 11 wherein said step of generating further comprises the step of comparing said control data with said oscillator clock signal to determine the frequency of said system clock signal.

13. A method according to claim 12 wherein said step of generating further comprises the steps of:

determining, over a predetermined period of time, whether said power control signal has changed state; and altering said clock control signal to cause the frequency of said system clock signal to be reduced when said power control signal remains active.

14. A method according to claim 12 wherein said step of generating further comprises the steps of:

determining, over a predetermined period of time, whether said power control signal has changed state; and altering said clock control signal to cause the frequency of said system clock signal to be increased when said power control signal remains inactive.

* * * * *